April 16, 1968    G. H. COGSDILL    3,377,890
DEBURRING TOOL
Filed June 8, 1966
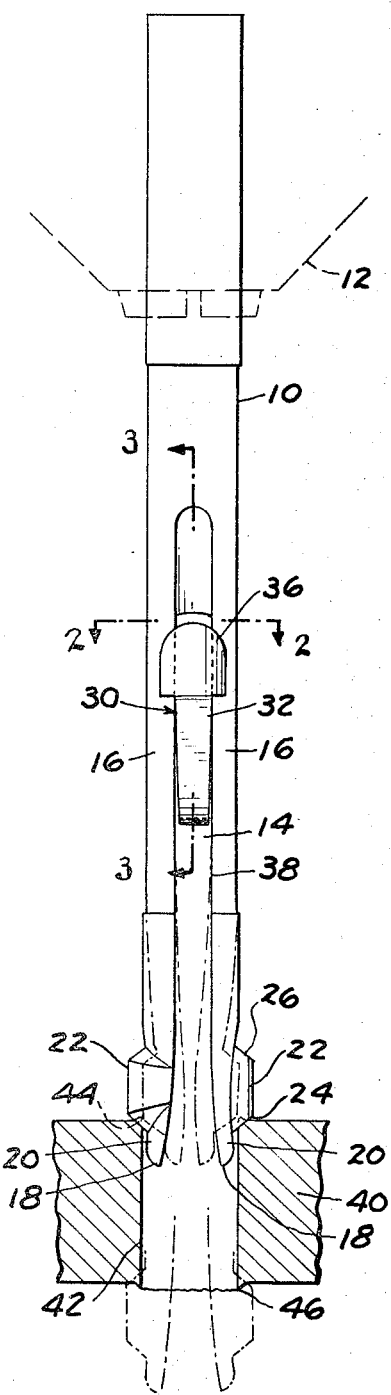
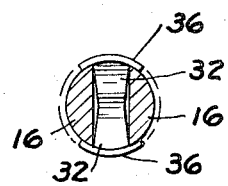
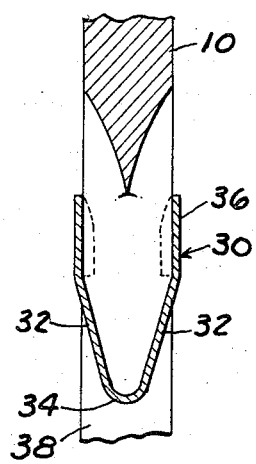
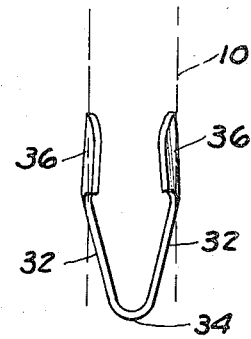
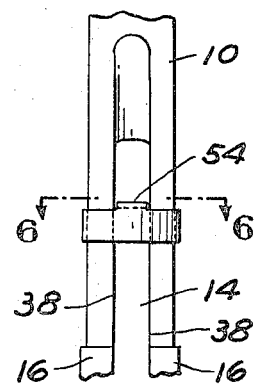
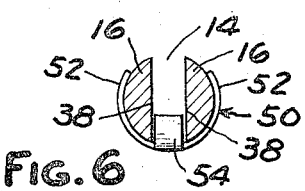
INVENTOR.
GLEN H. COGSDILL
BY
Barnes, Kisselle, Raisch & Choate
ATTORNEYS

United States Patent Office 3,377,890
Patented Apr. 16, 1968

3,377,890
DEBURRING TOOL
Glen H. Cogsdill, 48449 W. Nine Mile Road,
Northville, Mich. 48167
Filed June 8, 1966, Ser. No. 556,201
10 Claims. (Cl. 77—73.5)

This invention relates to a deburring tool; that is, a tool for removing burrs which usually form around the edges of holes drilled in metal workpieces.

In my Patent No. 3,217,570, dated Nov. 16, 1965, there is disclosed a deburring tool of the type having a shank having an end portion slotted axially to provide a pair of spring arms formed with cutting edges adjacent their free ends. A plunger is threaded into the opposite end of the shank for axial adjustment within the slot to control the tension in the spring arms so that the deburring action of the tool can be modified as desired in accordance with the type of material being worked, the size of the burr to be removed, etc. While my previously patented deburring tool has had wide commercial acceptance, it is believed that the deburring tool disclosed herein is an improvement thereover from the standpoint of cost of manufacture.

The tool of the present invention, like the tool disclosed in my previously referred to patent, incorporates means which are readily adjustable lengthwise between the spring arms for adapting the tool for deburring holes in materials which differ widely in hardness and for removing burrs of different sizes. However, the cost of manufacture of the tool of the present invention is less than my prior deburring tool because the need for forming threads on the plunger and in the bore of the shank is eliminated.

The tool of the present invention is characterized by the provision of a spring element slidably arranged within the slotted portion of the tool and frictionally engaged with the two spring arms so that it will retain its axially adjusted position between the spring arms to control the tension therein. The spring element is so designed as to extend radially outwardly beyond the spring arms a minimum extent to thus enable the shank of the tool to be driven through the hole in the workpiece being deburred.

In the drawings:

FIGURE 1 is an elevational view of the deburring tool of the persent invention illustrating the manner in which it operates to deburr the edges at opposite ends of a hole drilled through a metal workpiece.

FIGURE 2 is a sectional view along the line 2—2 in FIG. 1.

FIGURE 3 is a sectional view along the line 3—3 in FIG. 1.

FIGURE 4 is a view of the spring element employed for adjusting the tension in the spring arms of the tool.

FIGURE 5 is a fragmentary view showing a deburring tool of modified construction.

FIGURE 6 is a sectional view along the line 6—6 in FIG. 1.

Referring to the drawings, the deburring tool of the present invention comprises a cylindrical body 10 which forms the shank of the tool and which is adapted to be mounted in a rotating chuck or other holding device 12 of a machine tool. Body 10 is formed with a through slot 14 which extends to one end thereof so as to form a pair of spring arms 16 on opposite sides of slot 14, the arms being generally semicylindrical in cross-section. The free end 18 of each arm 16 is formed as a rounded nose portion which merges with a cylindrical pilot portion 20. Directly above the pilot portion 20 each arm 16 is formed with a cutting tool portion generally designated 22. Each cutting tool portion is in the form of a radial enlargement on the body having inclined cutting edges 24 at the axially opposite ends thereof. These cutting tool portions are substantially the same in configuration and operation as those shown on the deburring tool illustrated in my aforesaid patent.

Within the slot 14 there is arranged a spring member 30, which is preferably fabricated from sheet steel in the form of a leaf spring. Member 30 is generally V-shaped, having a pair of spring legs 32 connected by a bight portion 34. Legs 32 and bight portion 34 are dimensioned in width to correspond generally with the width of slot 14. At their free ends each leg 32 is provided with a pad 36 which is of arcuate configuration in cross-section to conform with the outer cylindrical surface of body 10. Thus, as shown in FIG. 1, each pad 36 overlaps the outer surface of the two spring arms 16 on each side of slot 14. Spring legs 32 are under tension and urge pads 36 toward each other so that they frictionally engage the outer cylindrical surfaces of spring arms 16 and thus tend to hold spring member 30 in the position to which it is adjusted axially within slot 14.

The purpose of the axially adjustable spring member 30 is to vary the effective length of slot 14 and thus vary the tension required to flex the spring arms 16, and therefore the cutting tools 22, toward one another. As soon as the spring arms 16 are flexed toward one another, the inner flat surfaces 38 thereof engage the bight portion 34 of spring member 30 to locate the fulcrum for the flexing action. It will be appreciated that the closer bight portion 34 is located to the free end of spring arms 16 the greater will be the force required to flex the spring arms 16 toward one another. Conversely, if the spring member 30 is shifted axially closer to the closed end of slot 14, arms 16 can be flexed toward one another with substantially less pressure. From the practical standpoint this is important for regulating the deburring pressure in relation to the type of material being deburred and the size of the burr being removed. For example, referring to FIG. 1, there is illustrated a metal workpiece 40 through which a hole 42 is drilled. In many applications it is necessary to remove the burr formed by the drilling operation around the edge of the hole on the top side of the workpiece as at 44 and also the burr formed around the edge of the hole at the bottom side of the workpiece as at 46.

In using the deburring tool of the present invention and assuming that the tool is being rotated by a drive member, such as the chuck 12, the pilot portion 20 of the tool is introduced into the hole 42 and the tool is driven downwardly while it is being rotated. The inclined lower cutting edges 24 engage the hole at the burr 44 and remove the burr therefrom as the tool is driven downwardly. Continued axial downward pressure on the tool causes the spring arms 16 to be cammed inwardly toward each other by the inclined cutting edges 24. Eventually the two spring arms will be cammed inwardly to the position shown in broken lines wherein the outer diameter of the cutting tool portions 22 corresponds to the diameter of hole 42 so that the cutting tool portions 22 can be driven downwardly through the hole. The pressure required to flex the spring arms 16 inwardly depends primarily upon the effective length of slot 14 and this in turn is determined by the position of spring member 30 axially of slot 14. When the spring arms 16 are flexed to the position shown in broken lines in FIG. 1, the tool can be advanced entirely through the hole 42 in the workpiece 40. It will be noted that the width of slot 14 is greater than the difference in diameters between the shank of body 10 and the cutting tool portions formed by the enlarged lands 22.

After the cutting tools 22 emerge from the hole 42 at the bottom side of workpiece 40, an upward force is applied to the tool so that the upper inclined cutting edges 26 engage the burr 46 around the lower edge of hole 42 and remove the burr therefrom as the tool is retracted upwardly through the workpiece.

Depending upon the material being worked upon, the size of the burr being removed and the extent of deburring required, the force required to flex spring arms 16 inwardly toward each other will vary considerably. If it is desired to increase the tension on arms 16, spring member 30 is shifted axially toward the free ends of spring arms 16. Conversely, if it is desired to decrease the tension on arms 16, spring member 30 is shifted axially toward the closed end of slot 14. In this connection it will be observed that spring member 30 is arranged in slot 14 so that the bight portion 34 is disposed toward the free ends of the spring arms and the pads 36 toward the closed end of slot 14. The spring tension in the two legs 32 of spring member 30 creates sufficient friction between pads 36 and the outer peripheral surfaces of spring arms 16 to retain spring member 30 in any position to which it is adjusted.

A modified form of tension adjusting means for the deburring tool is illustrated in FIGS. 5 and 6. In this embodiment the spring member, which is designated 50, is in the form of a thin, resilient sheet metal band which forms a segment of a circle having a circumference somewhat greater than 180°. This band comprises a pair of spring legs 52 extending circumferentially around the two spring arms 16 and having an integral tab 54 connected therewith and bent to project radially inwardly of slot 14. The width of tab 54 is only slightly less than the width of slot 14. The tension in the two spring legs 52 produces sufficient frictional contact between the inner faces of these spring legs and the outer peripheral surfaces of spring arms 16 to hold spring member 50 in any position to which it is manually adjusted. As soon as the spring arms 16 are flexed inwardly, the flat inner faces 38 thereof engage the side edges of tab 54 so that the tab determines the effective length of slot 14 and thus the fulcrum point for the spring arms.

Thus, it will be seen that I have provided a deburring tool which incorporates a means for adjusting the spring tension on the cutting tool portions thereof which determines to a large extent the cutting action obtained. The tool is economical to manufacture and the tension adjusting means are located substantially exclusively within the slotted shank of the tool. Thus portions of the tension adjusting means which extend outwardly beyond the periphery of the tool shank are very thin and offer substantially no obstruction to passage of the tool through the hole in the workpiece being deburred.

I claim:
1. A deburring tool comprising a cylindrical body having a through slot of generally uniform width at a portion thereof, said slot extending axially of said body to one end thereof to provide a pair of spring arms which are adapted to flex toward and away from each other, means adjacent the free ends of the spring arms forming a cutting tool adapted to deburr the edge of a hole in a metal workpiece when the tool is rotated and the spring arms are projected into the hole and means for varying the effective length of said slot comprising a spring member resiliently embracing a portion of the outer periphery of each spring arm, said spring member having a portion extending into said slot between said arms, said spring member resiliently engaging outer peripheral surface portions of said spring arms and being shiftable lengthwise of the slot.

2. A deburring tool as called for in claim 1 wherein said spring member comprises a leaf spring disposed within said slot and having pads at its opposite ends engaging diametrically opposite outer peripheral surface portions of said spring arms.

3. A deburring tool as called for in claim 1 wherein said spring member comprises a generally V-shaped leaf spring disposed within said slot and having a pad at the free end of each leg which embraces a portion of the outer peripheral surface of each spring arm of the tool body.

4. A deburring tool as called for in claim 3 wherein the width of the legs of the leaf spring corresponds generally with the width of said slot.

5. A deburring tool as called for in claim 4 wherein the leaf spring extends axially of the slot with the apex of the V disposed toward the free ends of the spring arms and the pads disposed toward the closed end of the slot.

6. A deburring tool as called for in claim 3 wherein said pads are formed as integral extensions of the legs of the leaf spring.

7. A deburring tool as called for in claim 6 wherein each pad has a width greater than said slot and overlies a portion of each spring arm adjacent the slot.

8. A deburring tool as called for in claim 1 wherein said spring comprises a resilient circular segment having a tab thereon which extends radially inwardly from a portion thereof intermediate the ends of the circular segment.

9. A deburring tool as called for in claim 8 wherein said resilient circular segment is formed of sheet metal and said tab comprises an integral portion of said sheet metal which is bent radially inwardly.

10. A deburring tool as called for in claim 9 wherein said segment extends around more than 180° of the periphery of said tool body but substantially less than 360° so that the ends of the circular segment can be sprung apart to enable the segment to be slidably arranged on the spring arms with the tab projecting into said slot.

References Cited

UNITED STATES PATENTS 3,298,256   1/1967   Cogsdill _____ 77—73.5

FRANCIS S. HUSAR, *Primary Examiner.*